H. RAU, Jr.
TWINE CUTTER.
APPLICATION FILED MAR. 10, 1911.
1,009,342.
Patented Nov. 21, 1911.
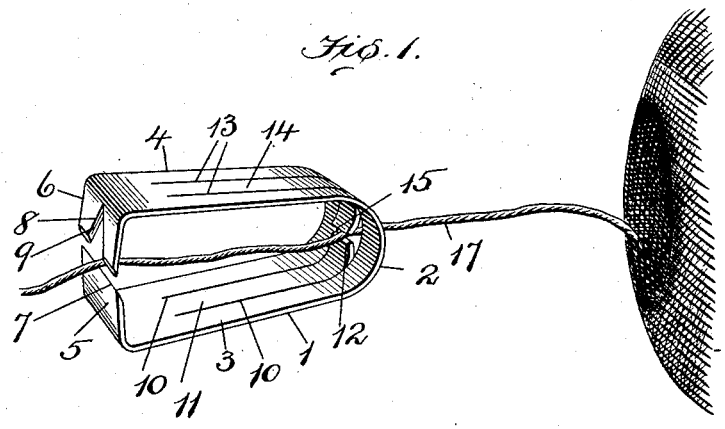
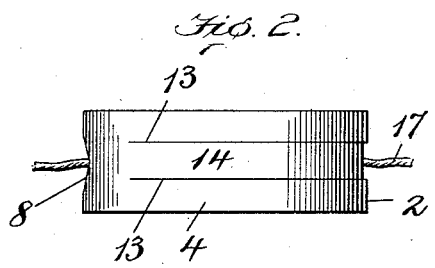
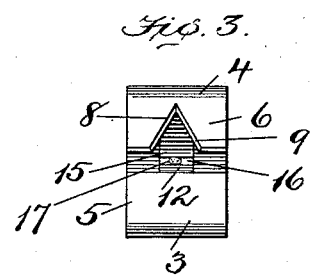
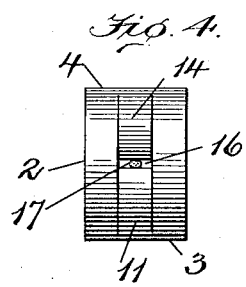
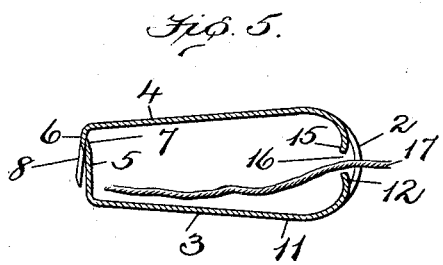
Witnesses
Edwin L. Bradford
G. Ferd. Vogt
Inventor
Henry Rau Jr.
By
Mann & Co.
Attorneys

UNITED STATES PATENT OFFICE.

HENRY RAU, JR., OF BALTIMORE, MARYLAND, ASSIGNOR OF ONE-HALF TO HERBERT R. OLIVER, OF BALTIMORE, MARYLAND.

TWINE-CUTTER.

1,009,342.  Specification of Letters Patent.  Patented Nov. 21, 1911.

Application filed March 10, 1911. Serial No. 613,525.

*To all whom it may concern:*

Be it known that I, HENRY RAU, Jr., a citizen of the United States, residing at Baltimore, in the State of Maryland, have invented certain new and useful Improvements in Twine-Cutters, of which the following is a specification.

This invention relates to an improved cutter for cord or twine and has for its object to provide an exceedingly simple and inexpensive device of this character which may be carried on the free or feed end of a ball or roll of cord or twine so the latter may be drawn therethrough as the same is used and which will always be in position for immediate use in severing or cutting the cord or twine at the point desired.

Another object is to provide an improved construction of cutter which may be formed by dies and with integrally-formed parts and which is provided with means for gripping the cord or twine when not in use to prevent its accidental detachment therefrom.

With these and other objects in view the accompanying drawing illustrates the invention wherein, Figure 1 is a perspective view of the improved cutter and is shown attached to the free end of a ball or roll of twine ready for use. Fig. 2, is a top plan view of the same. Fig. 3, is a front end elevation of the device. Fig. 4, a rear end elevation of the same, and Fig. 5, is a longitudinal section through the cutter, the same being shown in the operated or cutting position and the gripping members released to enable the twine to be pushed or pulled forward.

In the drawing the numeral, 1, designates a spring metal plate having a bend or fold, 2, substantially midway between its ends and forming movable members, 3 and 4, respectively. The movable member, 3, has a laterally bent end, 5, while the member, 4, has a laterally bent end, 6, which ends, when the members are in the normal position project toward or confront each other. In the present instance the end, 5, has an edge, 7, which is beveled along one side to form an effective cutting edge while the other end, 6, has a V-shaped notch, 8, whose inclined walls, 9, are also beveled to produce cutting edges. Normally the cutting edges of the two ends are held by the natural spring of the metal in a separated or spaced-apart position as clearly seen in Fig. 1, so that the free end of the cord or twine may be readily laid across the edge, 7, as will presently be more fully explained.

The member, 3, of the cutter has a plurality of spaced-apart longitudinal slits, 10, which form a finger, 11, that extends toward and partly around the bent or folded end, 2, of the cutter where the finger terminates in an inturned end, 12. The member, 4, also has parallel slits, 13, which form a finger, 14, that also extends toward and partly around the bent or folded end, 2. This latter finger, 14, also has an inturned end, 15, that confronts but is spaced from the end, 12, of the finger, 11, thus providing a space, 16, through which the cord or twine, 17, may be inserted so as to pass between the fingers, 11, and, 14, and toward the cutting edges, 7, and, 9.

In the operation of the cutter the cord or twine, 17, is inserted in the space, 16, between the inturned ends, 12, and, 15, of the respective fingers, which operation is facilitated by compressing the forward ends of the two members that have the cutting edges toward each other, because upon compressing the said forward ends the rear ends of the fingers being free will expand or move away from each other and thereby increase the width of the space, 16, as shown in Fig. 5 of the drawing. It is obvious that the cord or twine may be drawn through the space, 16, so that the end of the cord may be wrapped about a package to tie the latter, then when it is desired to cut the cord a slight compression at the forward end of the cutter will enable the latter to be moved on the cord to the point where the cut is to be made, whereupon the cord will be laid between the cutting edge, 7, and, 9, and the members, 3, and, 4, compressed sufficiently to make the cut. When the members are again released the inturned ends, 12, and, 15, of the fingers will pinch the cord or twine and hold the cutter in place so it will not become accidentally detached.

By means of the construction described the cutter will remain on the cord or twine where it will always be accessible and the capability of movement back or forth will enable the cord or twine to be cut at the desired point without waste of the cord.

Having thus described my invention what I claim and desire to secure by Letters Patent is,—

1. A twine cutter comprising a plate having a fold between its ends forming two movable members and each member having a cutting edge at its end,—each of said members also having a spring finger punched therefrom and projecting toward the said fold in the plate and the ends of the two fingers being separated to form a space for the passage of the twine toward the cutting edges of the members.

2. A twine-cutter comprising two movable members each having an end that serves as a cutting edge, and two movable fingers each attached by one of its ends to a different one of said cutting members and leaving two finger-ends free and projecting in a direction away from the cutting edges and serving to pinch the twine and hold the cutter in position thereon.

In testimony whereof I affix my signature in presence of two witnesses.

HENRY RAU, Jr.

Witnesses:
G. FERD. VOGT,
CHARLES B. MANN, Jr.

Copies of this patent may be obtained for five cents each, by addressing the "Commissioner of Patents, Washington, D. C."